(12) United States Patent
Duran et al.

(10) Patent No.: US 7,857,966 B2
(45) Date of Patent: Dec. 28, 2010

(54) STORM WATER INLET APPARATUS

(76) Inventors: Lee A. Duran, 53 Mount Archer Rd., R.R. 2, Lyme, CT (US) 06371; Thomas J. Mullen, III, 7 Mariners Walk Way, Middle River, MD (US) 21220

( * ) Notice: Subject to any disclaimer, the term of this patent is extended or adjusted under 35 U.S.C. 154(b) by 95 days.

(21) Appl. No.: 12/333,857

(22) Filed: Dec. 12, 2008

(65) Prior Publication Data
US 2010/0147756 A1 Jun. 17, 2010

(51) Int. Cl.
E02F 5/16 (2006.01)
(52) U.S. Cl. .................. 210/162; 210/163; 210/170.03; 210/207; 210/501; 404/4
(58) Field of Classification Search .................. 210/154, 210/162, 163, 164, 170.03, 242.1, 206, 207, 210/501; 404/4, 5
See application file for complete search history.

(56) References Cited

U.S. PATENT DOCUMENTS

| 5,165,821 | A |   | 11/1992 | Fischer et al. |            |
|-----------|---|---|---------|----------------|------------|
| 5,264,134 | A | * | 11/1993 | McCamy         | 210/747    |
| 6,083,402 | A | * |  7/2000 | Butler         | 210/170.03 |
| 6,126,817 | A |   | 10/2000 | Duran et al.   |            |
| 6,270,663 | B1| * |  8/2001 | Happel         | 210/163    |
| 6,537,446 | B1| * |  3/2003 | Sanguinetti    | 210/163    |
| 6,551,023 | B2| * |  4/2003 | Allard         | 210/163    |
| 6,767,456 | B2| * |  7/2004 | Middleton et al.| 210/170.03|
| 7,404,892 | B2| * |  7/2008 | Shaw et al.    | 210/163    |
| 2005/0279709 | A1 | * | 12/2005 | Peters et al. | 210/163 |
| 2006/0260996 | A1 | * | 11/2006 | Brownstein et al. | 210/242.4 |
| 2007/0012610 | A1 | *  | 1/2007 | Shaw et al. | 210/209 |

OTHER PUBLICATIONS

United States Environmental Protection Agency; EPA New England's Center for Environmental Industry and Technology (CEIT); "Storm Water Virtual Trade Show AbTech—Passive Skimmer with Smart Sponge(R)"; www.epa.gov/region01/assistance/ceitts/stormwater/techs/abtechskimmer.html; retrieved on May 12, 2008; 3 pages.

Clean Water made Easy; "Hula Bug in Antimicrobial Fabric Control bacterial proliferation in catch basins and sumps"; Copyright 2002-2007 Eco-Tec, Inc. all rights reserved; http://www/adsorb-it.com/Products/HulaBug.html; 1 pages.

(Continued)

*Primary Examiner*—Christopher Upton
(74) *Attorney, Agent, or Firm*—St. Onge Steward Johnston & Reens LLC

(57) ABSTRACT

An apparatus for reducing pollution in wastewater that collects in a catch basin is disclosed. The apparatus includes a hood affixed to an interior wall of a catch basin over an outlet, and a skirted boom adjacent to at least a portion of said hood and fixed relative to the hood. The skirted boom includes an upper portion and a skirt extending down from the upper portion. The skirted boom is installed so that the upper portion of the skirted boom is adjacent to said hood at the static water level in the catch basin and the skirt extends downward, preferably below the bottom of the hood. A tether assembly for installing the apparatus and a method of using the same is further disclosed.

20 Claims, 7 Drawing Sheets

OTHER PUBLICATIONS

T.J. Mullen; "Maximum Utility for Minimum Cost: Simple Structural Methods for Stormwater Quality Improvement"; ASCE (2003); 12 pages.

United States Environmental Protection Agency; EPA New England's Center for Environmental Industry and Technology (CEIT); "Storm Water Virtual Trade Show StreamGuard (TM) Passive Skimmer"; www.epa.gov/region01/assistance/ceitts/stormwater/techs/streamguardsskimmer.html, retrieved on May 12, 2008; 4 pages.

* cited by examiner

Fig. 5
Fig. 6
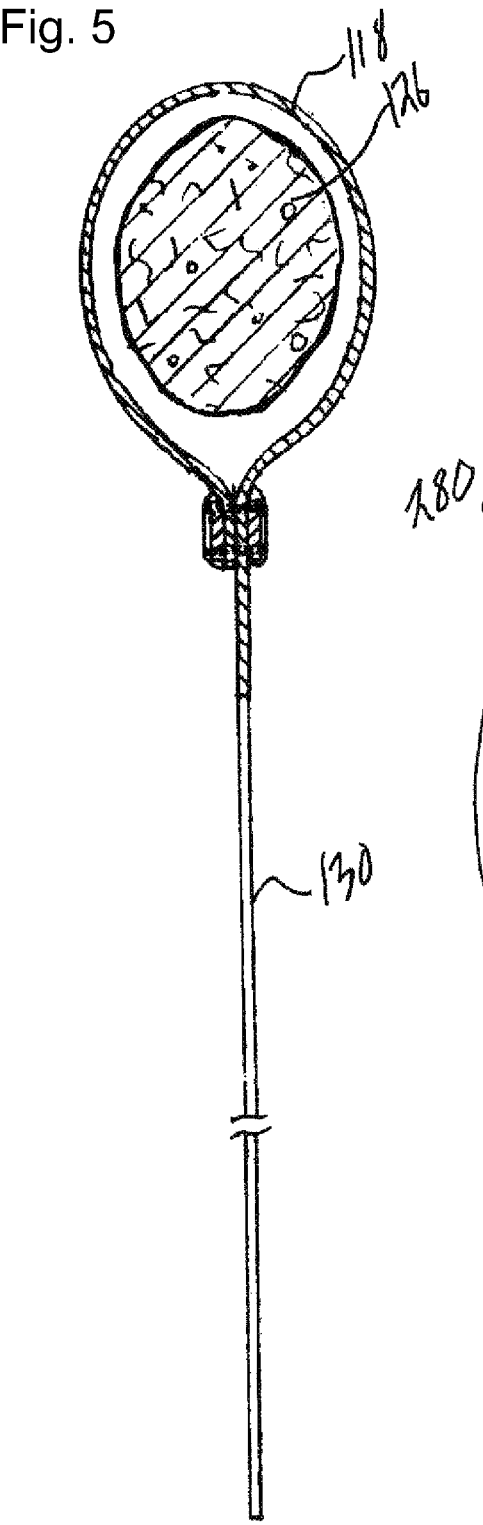
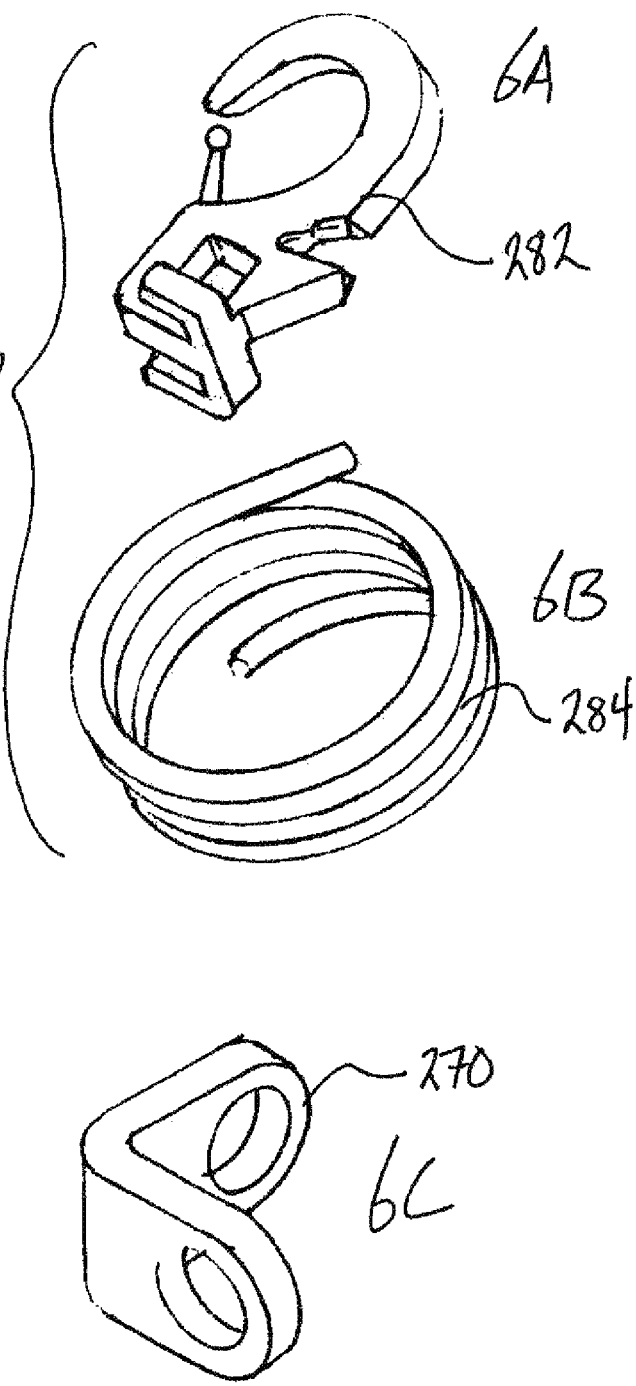

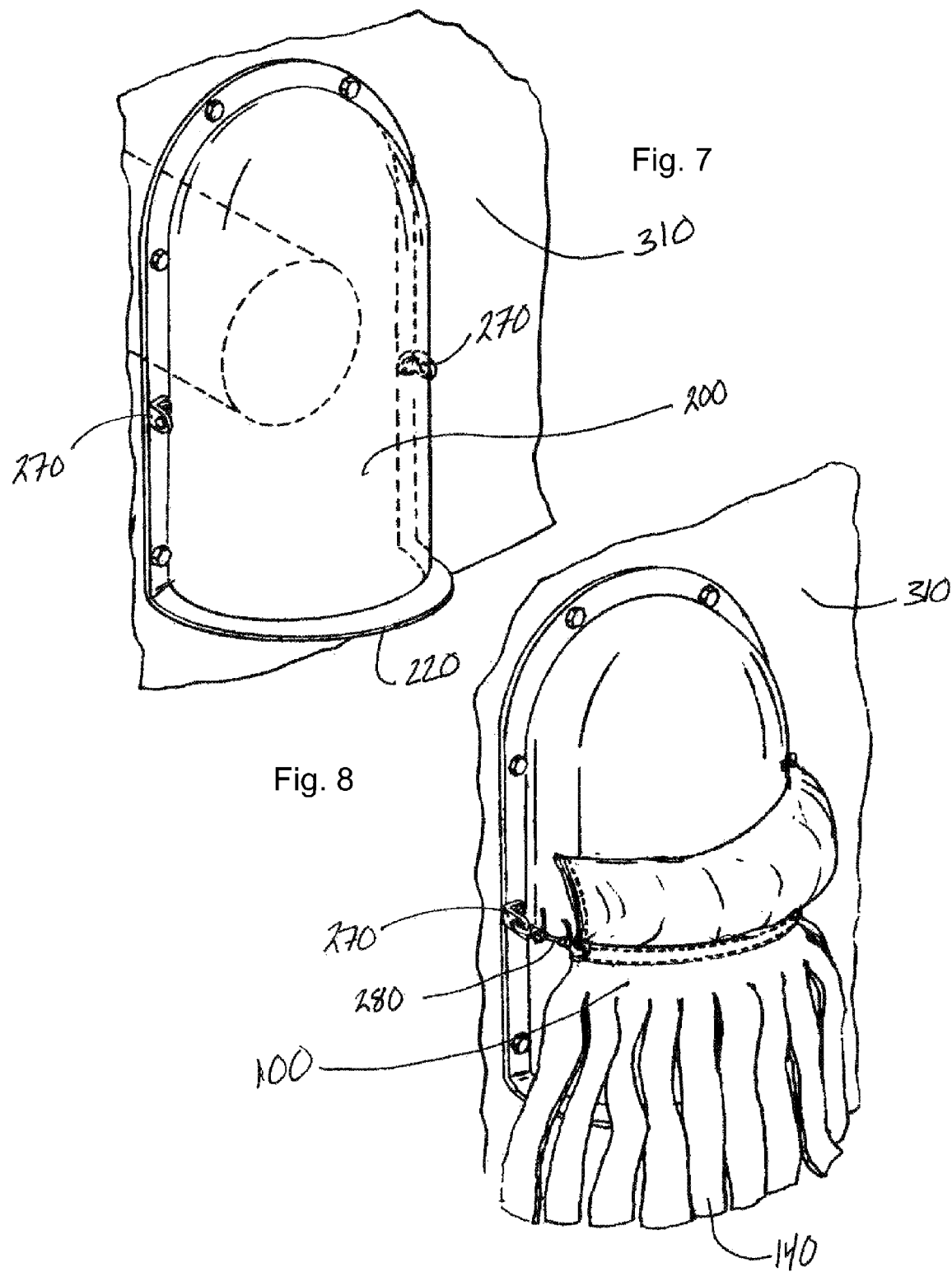

STORM WATER INLET APPARATUS

FIELD OF THE INVENTION

The present invention relates to a low cost and effective device for controlling and reducing the flow of bacteria, hydrocarbons, and other pollutants into a stormwater inlet. More particularly the invention relates to a hood installed to the wall of a catch basin over an outlet and a skirted boom fixed relative thereto so that at least a portion of the skirted boom is adjacent to the hood.

BACKGROUND OF THE INVENTION

Stormwater runoff is characterized by the United States Environmental Protection Agency as one of the greatest remaining sources of water pollution in America. Thus, efforts to implement stormwater quality improvement regulations are accelerating across the United States, compelling municipalities and land developers to maximize the usefulness and effectiveness of stormwater infrastructure.

In urban, suburban, and commercial settings polluted stormwater is often collected in a catch basin. In its simplest form, a catch basin functions to intercept surface water flows in order to prevent the accumulation of stormwater in an area where flooding could impede traffic or pedestrians, cause property damage, or otherwise present a nuisance. Stormwater, also referred to as wastewater, collects in the catch basin, and flows through a network of pipes, sewers, and additional catch basins to an outlet point such as a lake, stream, river, ocean, unpopulated area, or similar location where the wastewater is dispersed without the threat of flood or property damage. However, catch basins are also often the entry point of pollutants from diffuse sources found in stormwater runoff. For example stormwater runoff may contain pollutants such as hydrocarbons (also referred to as "oil"), bacteria, sediment, trash, organic material such as leaves, grass clippings, sediment, detergents, coolants, grease, fertilizer, paint, and feces. As a result, wastewater is often discharged untreated, directly into lakes, streams, and oceans.

As discussed in U.S. Pat. No. 6,126,817 to Duran et al., which is hereby incorporated by reference, many types of equipment and processes have been suggested in the past for reducing the level of pollutants in wastewater. Many of these systems are based on the principle of differential specific gravity separation. The liquid mixture, which usually is wastewater, flows slowly through an elongated path in a liquid-retaining structure, such as, for example, a catch basin. The matter to be collected is usually oil and floatable debris, both of which accumulate on the surface of the wastewater because they have a specific gravity lower than that of water. Alternatively, as the wastewater flows through the catch basin solids carried by the wastewater accumulate on the bottom of the basin. These solids sink to the bottom of the catch basin because they have a specific gravity greater than water.

U.S. Pat. No. 6,126,817 discloses a novel outlet hood (or "hood") for use in a catch basin to reduce the flow of oil and other pollutants into an outlet pipe in the catch basin. The hood is useful for capturing trash and floatables, and modest levels of free oils, and sediment. The hood is sealably mounted to the wall of a catch basin over the outlet pipe in the wall of the catch basin. The hood is installed on the wall of the catch basin such that the bottom of the hood is below the lowest level of the outlet pipe. As wastewater collects in the catch basin heavier pollutants sink and collect on the bottom of the catch basin. Other pollutants having a specific gravity less than water, such as debris, floatables, and oil float on the surface of the wastewater.

The bottom of the hood prevents pollutants with a specific gravity lower than water from entering the outlet pipe since the bottom of the hood extends below the water line of the wastewater. As the wastewater level rises in the catch basin, water flows underneath the bottom of the hood, which is well below the surface of the water, and into the outlet pipe. Pollutants with a specific gravity lower than water, however, remain on the surface of the wastewater. The wall of the hood acts as a barrier and prevents the oil and other floatables from flowing into the outlet pipe. Periodically, the catch basin is cleaned to remove oil and other floatables that have accumulated therein, as well as sediment that has accumulated in the bottom of the catch basin. In this way the hood provides an inexpensive means of reducing the level of pollution in wastewater.

A known problem with such hood systems is that, while they retain oil and other floatables for later collection, there is no means for absorbing pollutants, for example oil, bacteria, and chemicals, that collect on the surface of the wastewater between scheduled maintenance collections. Many times the scheduled maintenance collections occur infrequently, for example once per year, or every other year. As a result pollutants collect on the surface of the wastewater in the catch basin. Overtime some of the collected pollutants can be drawn below the surface of the wastewater and below the bottom level of the hood, and into the outlet pipe as a result of pressure gradients that are generated by water exiting and entering the catch basin. This problem is compounded during high wastewater flow events when the volume of wastewater passing through the catch basin greatly increases. The high flow rate creates turbulent conditions in the wastewater flowing through the catch basin, thereby increasing the opportunity for pollutants to flow under the bottom of the hood and into the outlet.

One known solution to this problem is to place a pollutant absorbent boom into the catch basin so that it floats on top of the wastewater and absorbs pollutants, such as oil, that are retained in the catch basin. The pollutant absorbent boom floats freely on the top surface of the wastewater, so that it absorbs oil and other pollutants on the top surface of the wastewater. Periodically, the pollutant absorbent boom becomes saturated with oil and other pollutants and is replaced with a new or cleaned absorbent boom. Replacing the boom is relatively easy because it floats freely on the wastewater in the catch basin, thus an absorbent boom can be replaced without the need for maintenance personnel to enter the catch basin. This is preferred because any maintenance procedure that requires entry into the catch basin increases the maintenance time and therefore cost.

One example of an absorbent boom used to reduce pollutants is the skirted boom sold by Eco-Tec, Inc. under the trade name the Hula Bug™. The skirted boom comprises an absorbent boom that floats on the surface of the water and a skirt that hangs down therefrom. The boom may be formed into a circle by connecting the two ends of the boom and then placed into a catch basin. The skirted boom floats freely across the surface of the wastewater and collects oil and oil-borne contaminants. The skirt, which may comprise a series of tendrils, hangs below the boom in the wastewater and provides additional absorbent surface area while the separation between tendrils allows wastewater to pass.

A disadvantage of free floating absorbent pads or booms is that they must be periodically replaced to maintain a consistent level of pollutant reduction. Once a boom becomes saturated with oil and other pollutants, it cannot absorb additional pollutants that continue to flow through the catch basin and into the outlet pipe.

Another disadvantage of known skirted booms is that they float freely on the surface of the wastewater.

Another disadvantage of known skirted booms is that that they are less effective at retaining pollutants during high flow events such as a rainstorm. During relatively low flow conditions, the skirted boom floats on the surface of the wastewater and collects pollutants. As the rate of flow increases the absorbent boom has less time to absorb an increasing amount of pollutants flowing through the catch basin.

Another disadvantage of known skirted booms is that they do not prevent turbulent water flows from drawing floatables, trash and other debris into the outlet pipe of the catch basin.

What is desired therefore, is an apparatus for reducing the flow of pollutants such as hydrocarbons, bacteria, and other floatables into the outlet of a catch basin. Another desire is an apparatus and a method for using the same wherein the apparatus combines a hood and a skirted boom in a configuration that more efficiently and more consistently reduces the flow of pollutants into the outlet of a catch basin. Another desire is a method of installing and removing such an apparatus without the need for personnel to enter the catch basin. What is further desired is a system and method for reducing pollutants floating on the surface of the wastewater from being drawn under the bottom of an installed hood by turbulent wastewater.

SUMMARY OF THE INVENTION

It is therefore an object of the present invention to provide an apparatus for retaining and/or absorbing pollutants in wastewater that flows through a catch basin.

Another object of the present invention is to provide an apparatus comprising a skirted boom in combination with a hood installed to the wall of a catch basin over an outlet in the wall of the catch basin so that the provided apparatus reduces the flow of pollutants more effectively than either a skirted boom or hood alone.

Another object of the present invention is to provide an apparatus that filters wastewater that flows under the bottom of a hood installed to the wall of a catch basin over an outlet.

Another object of the present invention is to provide a method of securing a skirted boom relative to a hood installed in a catch basin wherein the skirted boom and hood in combination reduce the flow of pollutants more effectively than either the skirted boom or hood alone.

Another object of the present invention is to provide an apparatus comprising a skirted boom in combination with a hood installed to the wall of a catch basin over an outlet pipe so that the provided apparatus absorbs pollutants such as hydrocarbons and/or other bacteria, and reduces the amount of such pollutants that are drawn under the bottom surface of the hood by turbulent water flows, and pressure gradients in the water.

A further object of the present invention is to provide a method of securing the skirted boom relative to a hood in a catch basin.

A further object of the present invention is to provide a method for installing and removing a skirted boom in a catch basin.

A further object of the present invention is to provide a method for installing and removing a skirted boom relative to a hood installed to the wall of a catch basin over an outlet pipe.

These and other objects of the present invention are achieved through an apparatus comprising a hood and a skirted boom, wherein the skirted boom is adjacent to at least a portion of the hood affixed to the wall of a catch basin over an outlet, and wherein the skirted boom is fixed relative thereto. The skirted boom may have an upper portion including a boom, and a boom cover, and a lower portion extending down from the upper portion, wherein a least a portion of the lower portion includes one or more vertical strips, and wherein at least a portion of the vertical strips extend below a bottom of the hood.

The invention and its particular features and advantages will become more apparent from the following detailed description considered with reference to the accompanying drawings.

BRIEF DESCRIPTION OF THE DRAWINGS

Exemplary embodiments of the invention are explained in more detail in the description which follows and are represented in the drawings, in which:

FIG. 5 is a cut away view AA, as indicated in FIG. 2 of the skirted boom shown in FIG. 1B.

FIGS. 6A, 6B, and 6C show a tether assembly for securing the skirted boom relative to said installed hood. FIG. 6A is an orthogonal view of an adjustable hook. FIG. 6B is an orthogonal view of a cord. FIG. 6C is an orthogonal view of a mounting bracket.

FIG. 7 is an orthogonal view of a hood affixed to the wall of a catch basin over an outlet pipe, wherein mounting brackets are installed on the left side and right side of the hood.

FIG. 8 is an orthogonal view of the hood shown in FIG. 7 wherein a skirted boom is fixed relative to said hood, the skirted boom being coupled to the left and right side mounting brackets via left and right side tether assemblies (note only one tether assembly is shown).

DETAILED DESCRIPTION OF THE INVENTION

Figure 1A:
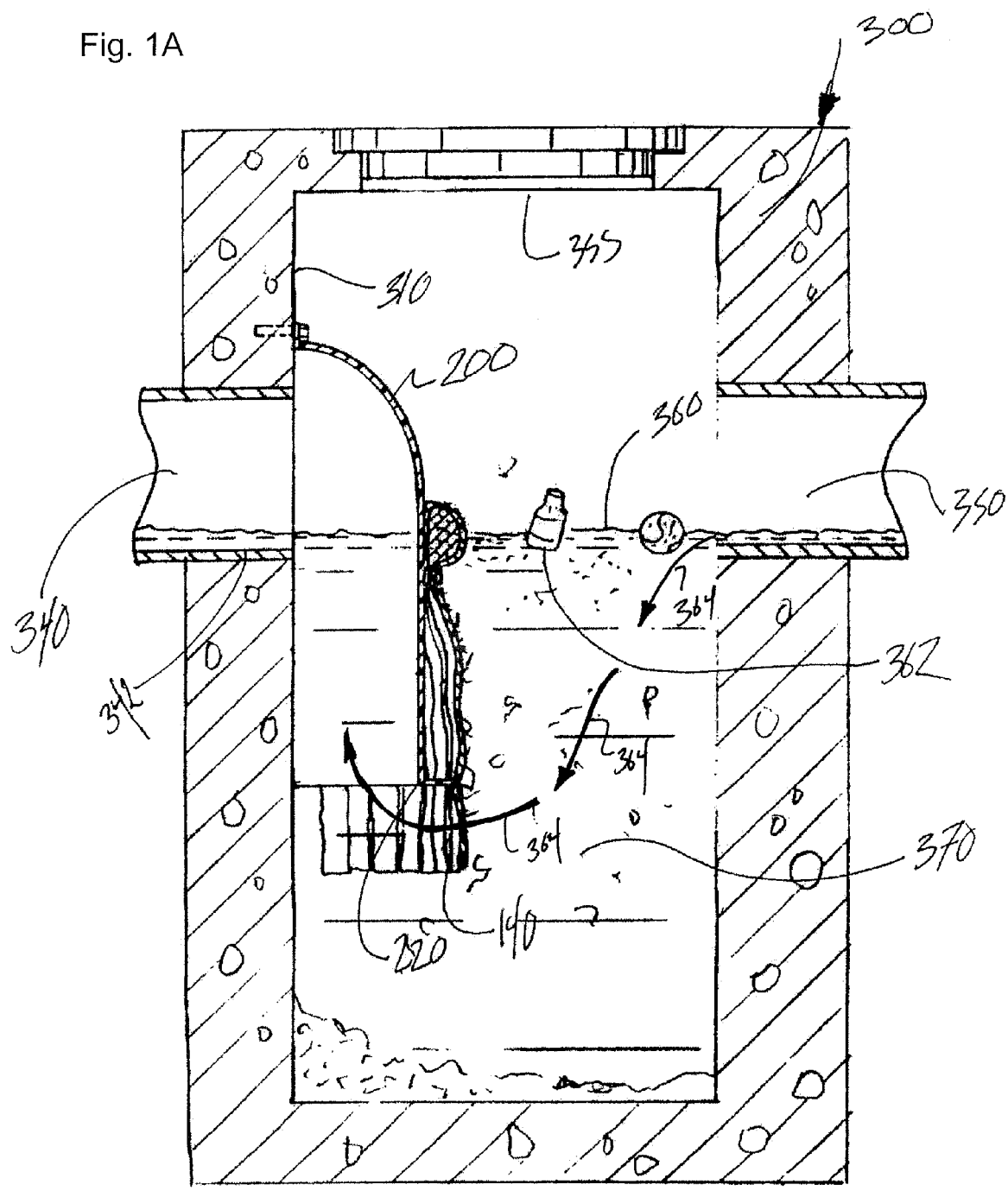
FIG. 1A is a cut away view of a catch basin, wherein a hood is affixed to the wall of a catch basin over an outlet pipe, and a skirted boom fixed relative there to such that a portion of the upper portion of the skirted boom surrounds a least a portion of the outer surface of the installed hood at a static waterline in the catch basin.

Referring now to the drawings, wherein like reference numerals designate corresponding structure through out the views.

FIGS. 1B, 2, 3, 4, and 5 depict a known skirted boom 100. The skirted boom 100 generally includes an upper portion 110 and a skirt 130. It should be understood that while reference is made to one or more embodiments of the skirted boom, many configurations and sizes of skirted booms may used and are readily apparent to one of skill in the art.

The upper portion 110 extends along a horizontal axis. The upper portion 110 has a left end 112 and a right end 114. The upper portion 110 further comprises a boom 126 and a boom cover 118. FIG. 5 illustrates cut away view AA in which the boom 126 is visible. The boom 126 is comprised of a first material and extends along the horizontal axis. The boom 126 is located between the left end 112 and right end 114 of the upper portion 110. The boom is not visible in FIG. 5 as it is located inside the boom cover.

It is preferred that the boom 126 is constructed from a hydrocarbon absorbent material. It should be noted that this disclosure refers to both hydrocarbon and oil, however no difference is implied or intended, and hydrocarbon and oil are used interchangeably. It is preferred that the hydrocarbon absorbent boom 126 extends from the left end 112 to the right end 114 of the upper portion 110 of the skirted boom 100.

It should be understood that the boom 126 may be constructed of any known material that can absorb oil or any other pollutant. Furthermore, the oil absorbent material and structure may take any form. For example, in reference to FIG. 5, the boom 126 has a circular cross section. In FIG. 11 an alternate embodiment of the boom 126A is shown, wherein the oil absorbent material comprises a loose material contained in the boom cover 118. Furthermore, in some embodiments of the invention a boom 126 is not required, or the boom 126 need not be oil absorbent. This is because the skirted boom 100 can still prevent oil and other pollutants from flowing into the outlet 340 of a catch basin 300 when the skirted boom is fixed relative thereto and surrounds an outer portion of the hood because the vertical adjacent strips 140 extending below the bottom surface 220 of the hood 200 and therefore filter wastewater passing under the bottom.

In reference to FIGS. 1A-5 the boom 126 is located between the left 112 and right 114 ends of the upper portion 110. It is preferable that the boom 126 extends substantially from the left end 112 to the right end 114 of the upper portion 110 so as to increase the oil absorbance of the skirted boom 100. In some embodiments the upper portion may simply consists of an absorbent boom and no boom cover.

The upper portion 110 of the skirted boom 100 may further include a boom cover 118, for covering the boom 126 and/or maintaining the boom 126 in position. The boom cover 118 may be constructed from a second material, however in some embodiments of the present invention the second material may be identical to the first material.

It is preferred that the boom cover 118 is constructed from a fabric like material so that it substantially encloses the boom 126. In reference to FIG. 1A, the boom cover 118 extends between the left end 112 and the right end 114 of the upper portion 110. In the disclosed embodiment the boom cover 126 comprises a sheet of fabric. An upper portion of the sheet of fabric is wrapped over and around the boom 126, so as to substantially enclose the boom 126. Afterward, the fabric is stitched 120 together below the boom 126 to form an enclosed casing for the boom 126. In reference to FIG. 1, the boom cover 118 is folded over the boom 126. The boom cover 118 is stitched together along a seam parallel to the horizontal axis below the boom 126, so as to form a horizontal compartment for the boom 126 between the left end 112 and right end 114 of the upper portion 110. The stitching 120 is shown in FIGS. 1B-5.

The boom cover 118 is further stitched on the left end 112 and the right end 114, so as to further enclose the boom 126. The stitching 120 is shown in FIGS. 1B-5. It should be understood that although stitching 120 is preferred, any known means may be used to substantially enclose the boom 126, in the boom cover 118. For example, it is possible to use snaps, Velcro®, rigid fasteners, or any other known means to substantially enclose the boom 126 in the boom cover 118. It should further be understood that although the illustrations show one method of folding the boom cover 118 to substantially enclose the boom 126, many different configurations are readily known and may be used to enclose the boom 126. The disclosed means is preferred because it is a simple construction, that is inexpensive to manufacture, and provides a strong enclosure for the boom 126 that can withstand the harsh environmental conditions in a catch basin 300.

It is preferred that the boom cover 118 is constructed from a geo-textile quality needle woven filtration fabric. This type of fabric is preferred because it is durable and can withstand the harsh environment in a catch basin 300. For example, this material can withstand cyclic soaking and drying over an extended period of time without becoming worn or damaged. This is important because it allows the skirted boom 100 in combination with an installed hood 200 to continually prevent oil and other pollutants from flowing into the outlet pipe 340. The material is also preferred because it is hydrocarbon permeable. Hydrocarbons that collect on the top surface of the wastewater 370 in the catch basin 300 can pass through the fabric of the boom cover 118 and be absorbed by the boom 126. It should be understood that the boom cover 118 can be any material including fabrics, and other types of material. For example, in some embodiments the boom cover 118 may be hydrocarbon impermeable. In other embodiments the boom cover 118 may comprise a rigid material. Finally, in other embodiments of the invention the second material may be hydrocarbon absorbent.

In some embodiments it is preferred that the boom cover 118 is treated with an anti-bacterial material. The filtration fabric of the boom cover 118 absorbs wastewater, including bacteria, that has collected in the wastewater. When the bacteria in the wastewater contact the treated material of the boom cover 118 they are killed. For example, it is preferred that the boom cover 118 is treated with covalently surface bonded non-leaching anti-microbial coating. This type of coating is well known. It should be understood that in some embodiments of the present invention the boom cover 118 material need not be treated with any application.

As discussed above, the skirted boom 100 generally includes an upper portion 110 and a skirt 130. The skirt 130 is attached, coupled, or fixed relative to the upper portion 110 and extends down therefrom. In some embodiments the skirt 130 may comprise a piece of fabric that extends down from the upper portion 110. For example, in reference to FIGS. 1B-5, the skirt 130 comprises a piece of fabric having a top 132, a bottom 134, a left side 136, and a right side 138. It is preferred that the top 132 of the skirt 130 is approximately the same length, measured from the left side 136 to the right side 138, as the horizontal axis of the upper portion 110, as measured from the left end 112 to the right end 114. It should be understood that the top 132 of the skirt 130 may have many different dimensions.

In some embodiment the top 132 of the skirt 130 is coupled to the upper portion 110 between the left end 112 and the right end 114 of the upper portion 110. This allows the upper portion 110 and the skirt 130 to work together to reduce the flow of hydrocarbons and pollutants into the outlet pipe 340 when the skirted boom is secured relative to the hood in a catch basin. It is preferred that the top 132 of the skirt 130 is affixed to the upper portion 110 between the left end 112 and the right end 114 by stitching or some other known means. In some embodiments the boom cover 118 and the skirt 130 are the same piece of material. As discussed above the boom cover 118 is wrapped around the boom 126, and is fixed together so as to substantially enclose the boom 126. The boom cover 118 fabric simply extends downward from the horizontal stitching 120 below the boom cover 118 to form the skirt 130.

Further referring to FIGS. 1B-5, the skirt 130 extends downward from said upper portion 110. At least a portion of the bottom 134 of skirt 130 may include a plurality of adjacent vertical strips 140. The adjacent vertical strips 140 extend upward from the bottom 134 of the skirt 130. For example, in reference to FIG. 1B, the skirt 130 is a piece of fabric having a top 132, bottom 134, left side 136, and right side 138. The bottom 134 of the skirt has one or more slits 142 that extend upward from the bottom 134 of the skirt 130. It is preferred that the slits 142 extend upward so that the slits 142 are parallel to the left edge 136 and right edge 138 of the skirt 130. In some embodiments the slits 142 extend almost to the top 132 of the skirt 130. It should be understood that in some embodiments there is a space between the vertical strips. Also, in some embodiments there are multiple layers of vertical strips. Although the present invention does not require vertical strips, vertical strips are preferred because they allow water to flow through skirt, while simultaneously preventing floatables, such as aluminum cans, from flowing under the bottom level of the hood.

Referring to the embodiment shown in FIGS. 1B-5, the slits 142 are equally spaced across the bottom 134 of the skirt 130. The spacing of the slits 142 creates a plurality of vertical strips 140. The slits 142 extend upward toward the top 132 of the skirt to a slit end point 132. In the embodiments shown, the slits 142 are formed so that they are the same length. Furthermore, the slits 142 do not extend fully to the top 132 of the skirt 130. It is preferred that the strips 142 are at least 18 inches in length, but is should be understood that the strips 142 may be any length, and may vary in length from adjacent vertical strip 140 to adjacent vertical strip. It should also be understood that while it is preferred that the slits 142 are equally spaced across the bottom 134 of the skirt 130, there may only be one slit 142, or the slits 142 may be unevenly spaced. It should be understood that it is not required that the slits 142 are parallel.

In reference to FIG. 1A, a cut away of an skirted boom 100 is shown, secured relative to a hood 200 that is installed to the wall 310 of a catch basin 300 over an outlet pipe 340 in the wall 310 of the catch basin 300. As discussed in the background of the invention hoods 200 are known, as is the use of hoods 200 in catch basins 300 to reduce the flow of hydrocarbons, and other pollutants from entering an outlet pipe 340 of the catch basin 300.

In reference to FIG. 1A, the hood 200 is installed on the wall 310 of the catch basin 300. In this embodiment the hood 200 is bolted to the wall 310 of the catch basin, so as to form a sealed compartment 210. The hood 200 is further installed over an outlet 340 in the catch basin wall 310. In the embodiment shown, the static water level 360 in the catch basin 300 is defined by the lowest level 342 of the outlet pipe 340. The bottom of the hood 220 extends below the static water level 360, and below the lower level 342 of the outlet pipe 340 and into the wastewater. It should be understood that the compartment formed by the hood and the wall, may be open at the top or some other location to atmospheric air.

Wastewater enters the catch basin 300 from an inlet pipe 350, and/or from a storm grate 355 and collects in the bottom of the catch basin 300. The wastewater includes pollutants such as microbes, hydrocarbons, and other pollutants that accumulate in the wastewater. Pollutants, such as empty bottles, and hydrocarbons 362 float on the surface 360 of the wastewater accumulated in the catch basin 300 because they have a lower specific gravity than water. As the level of wastewater in the catch basin 300 increases 300 wastewater flows through the outlet pipe 340. The hood 200 helps prevent the pollutants from being drawn into the outlet pipe 340 because the bottom 220 of the hood 200 extends below the static level 360 of the wastewater, and therefore, below the surface of the wastewater. In order for water to flow into the outlet pipe 340, it must flow underneath the bottom 220 of the hood 200, and then into the outlet pipe 340. The lower than water specific gravity pollutants remain on the surface of the wastewater and do not enter the outlet pipe 340 because they will not flow beneath the bottom 220 of the hood 200, as a result of their lower than water specific gravity.

In reference to FIG. 8 and 1A, a skirted boom 100 is fixed relative to the hood 200 so that a portion of the skirted boom is adjacent to a least a portion of the installed hood 200 at a static waterline in the catch basin 300. In the embodiment shown in FIG. 8 the upper portion 110 of the skirted boom 100 surrounds the outer surface of the hood. It is preferred that the upper portion 110 is located at the static water level 360 in the catch basin 300. The skirt 130 extends down from the upper portion 110, such that the bottom 134 of the skirted boom 100 extends below the bottom 220 of the installed hood 200 and into the flow of wastewater. Preferably the vertical adjacent strips 140 extend below the bottom 220 of the hood 200 along the outer circumference of the hood 200.

In reference to FIG. 1A, the skirted boom 100 increases the efficacy of the installed hood 200 at reducing the flow of pollutants into the outlet pipe 340. The boom 126 absorbs hydrocarbons that accumulate on the surface of the wastewater 362. Without the boom 126 hydrocarbons would collect on the surface of the wastewater 362 until they are physically collected, for example by a maintenance crew, or they flow into the outlet pipe 340 as a result of adverse flow conditions in the catch basin 300. It should also be understood that in some embodiments of the invention, the skirted boom 100 does not absorb oil, but none the less still reduces the flow of oil into the outlet pipe by increasing the efficiency of the hood 200 because the vertical adjacent strips 142 extend below the bottom surface of the hood 220 and into the flow of the wastewater.

The skirted boom 100 increases the efficacy of the hood 200 at reducing the flow of pollutants into the outlet pipe 340 because the vertical adjacent strips 140 extend below the bottom 220 of the hood 200 to filter pollutants. In other words, the skirt acts as a barrier that allows wastewater to pass while preventing floatables from flowing into the outlet. During normal operations, wastewater 250 is drawn under the bottom 220 of the hood 200 and into the outlet 340. Because the flow is directed below the static water level and under the bottom of the installed hood, hydrocarbons, and other pollutants with a specific gravity lower than water are prevented from entering the outlet pipe 340.

In some cases, however, pollutants and floatables are drawn from the surface 362 of the wastewater and under the bottom 220 of the hood 200 as a result of pressure gradients that develop in the wastewater. In reference to FIG. 1A, the flow of wastewater in the catch basin is shown by arrows 364. The vertical adjacent strips 142 of the skirt extend below the bottom 220 of the hood 200 and into the flow of the wastewater. This positioning of the skirt relative to the hood enables the skirt to filter wastewater flowing under the bottom of the hood. The strips 140 extend into the flow and allow wastewater to pass, while at the same time absorbing hydrocarbons in the passing wastewater, and preventing larger pollutants, for example aluminum cans, from flowing into the outlet 340. For example some wastewater may pass through the slits between the vertical strips, while additional wastewater may pass through the skirt material itself. At the same time the skirt absorbs oil in the wastewater and prevents larger floatables from passing. Through this unique configuration of the hood and the skirt the pollution reducing benefits of the skirted boom 100 and the hood 200 are harnessed together to create a more effective means of reducing pollution in wastewater that flows through a catch basin.

Figure 1B:
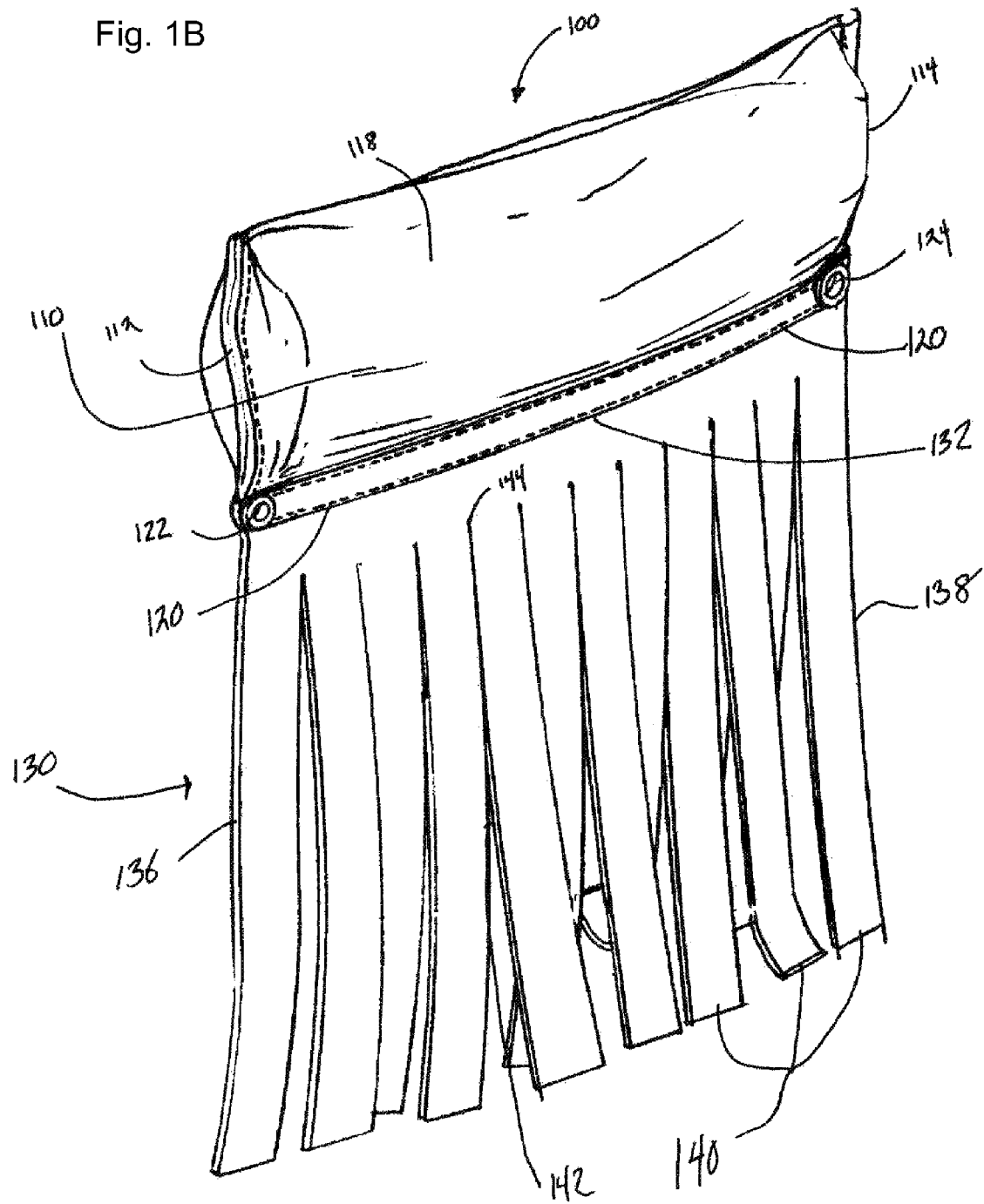
FIG. 1B is an orthogonal view of an embodiment of a skirted boom.
Figure 2:
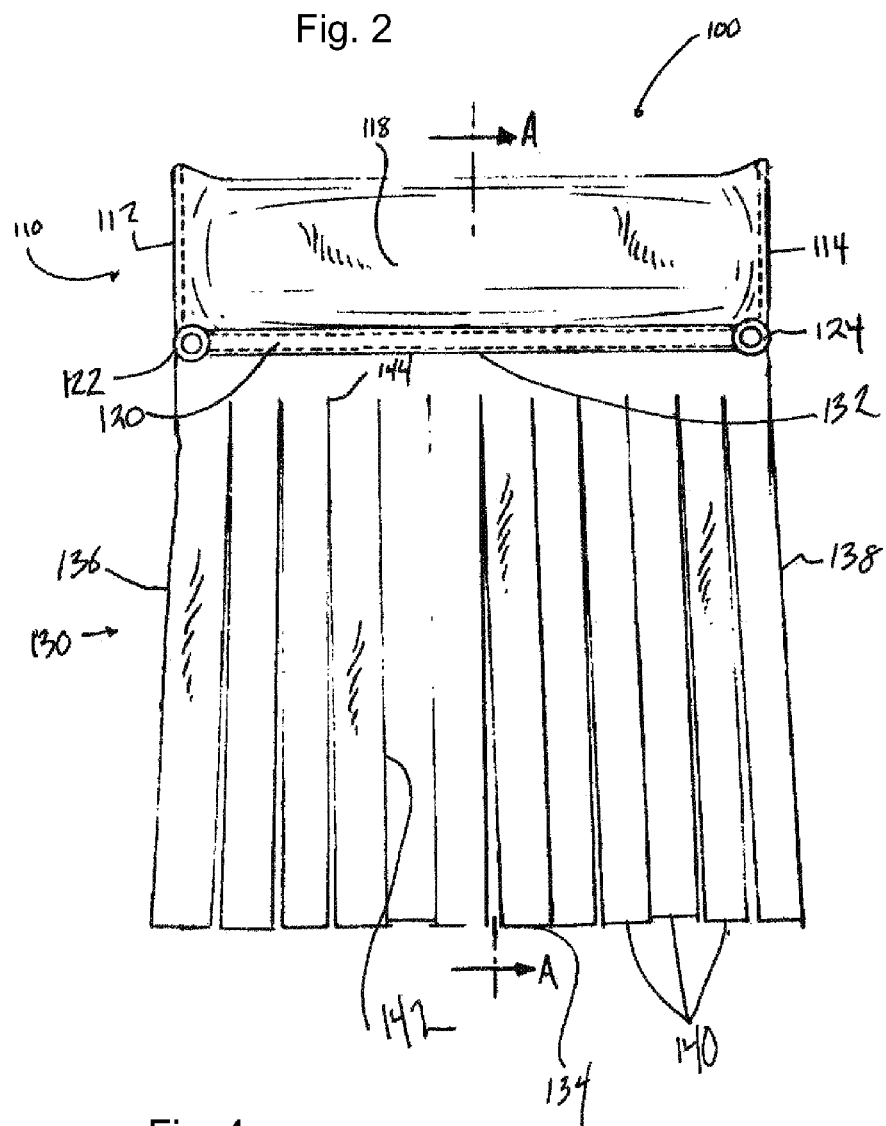
FIG. 2 is a front view of the skirted boom shown in FIG. 1B.
Figure 3:
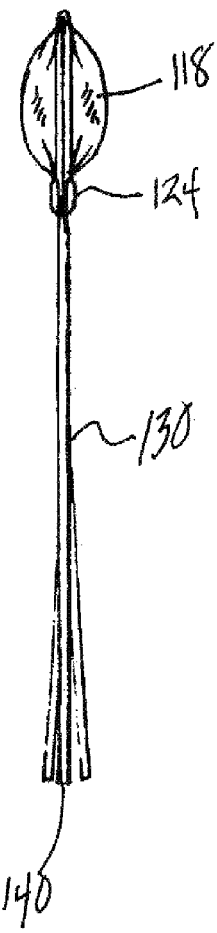
FIG. 3 is a side view of the skirted boom shown in FIG. 1B.
Figure 4:
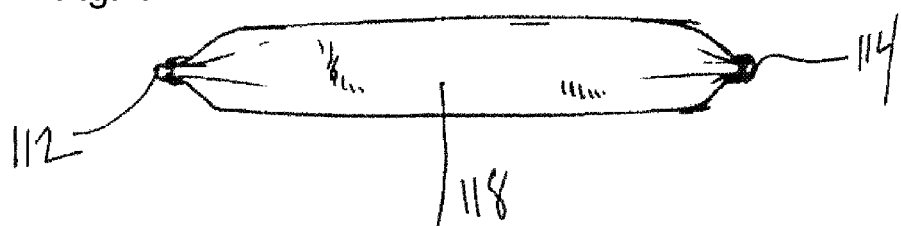
FIG. 4 is a top view of the skirted boom shown in FIG. 1B.

Referring to FIG. 1B, it is preferred that the skirted boom 100 includes attachment elements for securing said skirted boom 100 relative to said hood 200 in the catch basin 310. It should be understood that a number of different techniques and apparatus may be used to secure or fix the skirted boom 100 relative to the hood 200. Referring to FIG. 1B, the upper portion 110 includes grommets for securing the skirted boom 100 relative to the installed hood 200. In one advantageous embodiment a left grommet 122 is fixed to the left end 120 of the upper portion 110 and a right grommet 124 is fixed to the right end 140 of the upper portion 110. It is preferred that the grommets 122, 124 are located at the intersection of the upper portion 110 and the skirt 130 as shown in FIG. 1B. It is further preferred that the grommets 122, 124 are fixed to the upper portion 110 so that they can serve as a point for securing the skirted boom 100 relative to the hood. It should be understood that many different coupling points may be used on the skirted boom.

In FIGS. 7 and 8 a system for installing or securing a skirted boom 100 relative to a hood 200 is shown, wherein the skirted boom 100 is installed to the exterior surface of a hood 200. FIG. 7 shows a hood 200 installed to the wall 310 of a catch basin 300 over an outlet pipe 340. Two mounting brackets 270 are fixed on either side of the hood 200. It is preferred that the mounting brackets 270 are installed in the same plane, preferably at the static water level 360 in the catch basin 300. It should be understood that the mounting brackets 270 may be fixed directly to the hood 200, or the mounting brackets 270, may be fixed to the wall 310 of the catch basin 300. FIG. 6C shows a mounting bracket 270 used in one embodiment of the skirted boom installation system. It should be understood that many different types of mounting brackets may be used, however it is preferred that the mounting bracket 270 has a large receiving area 272 so as to increase the ease of installation.

FIG. 8 shows a skirted boom 100 fixed relative to the exterior surface of a hood 200 using the above described installation system. The skirted boom 100 is installed or secured so that the upper portion 110 comprising the absorbent boom 126 is substantially located at the static water level 360 in the catch basin 300. The left end 120 of the upper portion 110 is coupled to a mounting bracket 270 installed on the left side of the hood 200. Preferably the left grommet 122 is coupled to the mounting bracket 270 on the left side of the hood 200 via an attachment element. In reference to the embodiment disclosed in FIG. 8, the left grommet 122 is connected to the mounting bracket 270 via a tether assembly 280. In reference to FIGS. 6A and 6B the tether assembly 280 includes one or more adjustable hooks 282, and a length of cord 284. An adjustable hook 282 is attached to either end of the cord 284. The length of the cord 284 between the two adjustable hooks 282 may be varied. In some embodiments the cord 284 is made from an elastomeric material so that it can stretch during installation, and use, and return to its original position.

In reference to FIG. 8, one end of the tether assembly is connected to the mounting bracket 270 via the adjustable hook 282. The other end of the tether assembly is connected to the left grommet 122 via the adjustable hook 282. It is preferred that the length of the cord 284 between the two adjustable hooks 282 is pre-adjusted so that the upper portion 110 of the skirted boom 100 surrounds the exterior of the hood 200 at the static water level 360. The right end 114 of the upper portion 110 of the skirted boom 100 is coupled to a mounting bracket 270 fixed on the other side of the installed hood 200, not shown in FIG. 8. It should be understood that many different systems may be used to install and/or fix the skirted boom 100 relative to the hood.

The tether assembly 280 installation system described above is preferred because it allows a skirted boom 100 to be installed, or removed without entering the catch basin 300. The system reduces installation time and maintenance costs because there is no need to physically enter the catch basin. Rather, to install skirted boom 100, the catch basin cover 355 is removed from the catch basin 300, and a skirted boom 100 is lowered into catch basin. The skirted boom may be lowered using, for example, one or more guide poles, preferably with hooks at the distal ends. In other embodiments the skirted boom 100 may be lowered with sling, or length of cord. Prior to lowering the skirted boom 100, a tether assembly 280 should be attached to the left grommet 122, and a second tether assembly 280 should be attached to the right grommet 124. The tether assemblies 280 should have their cord 284 lengths adjusted so that the skirted boom 100 will securely wrap around the hood 200 when installed. However in some embodiments the tether assemblies 280 may be adjusted after installation.

The skirted boom 100 is lowered into the catch basin 300 via a hood, rope, line, guide pole, or some other device that allows an operator to support and maneuver the skirted boom 100 during installation, and allows the operator to remove the installation device after the skirted boom 100 is installed. The skirted boom 100 is rotated so as to connect the distal end of the tether assemblies to the installed mounting brackets 282. In this way the skirted boom 100 is installed without human entry into the catch basin 300.

Likewise, when the skirt needs to be removed, an operator can remove the catch basin cover 355, and lower a hook and pole into the catch basin 300. Using the distal ends of the hook and pole, the operator may manipulate the skirted boom so as to uncouple the left and right tether assemblies 270. After the tether assemblies 270 are removed, the skirted boom 100 can be raised from the catch basin 300, and another, preferably clean, skirted boom 100 installed. It should be understood that there are many different methods for installing a skirted boom 100.

Figure 9:
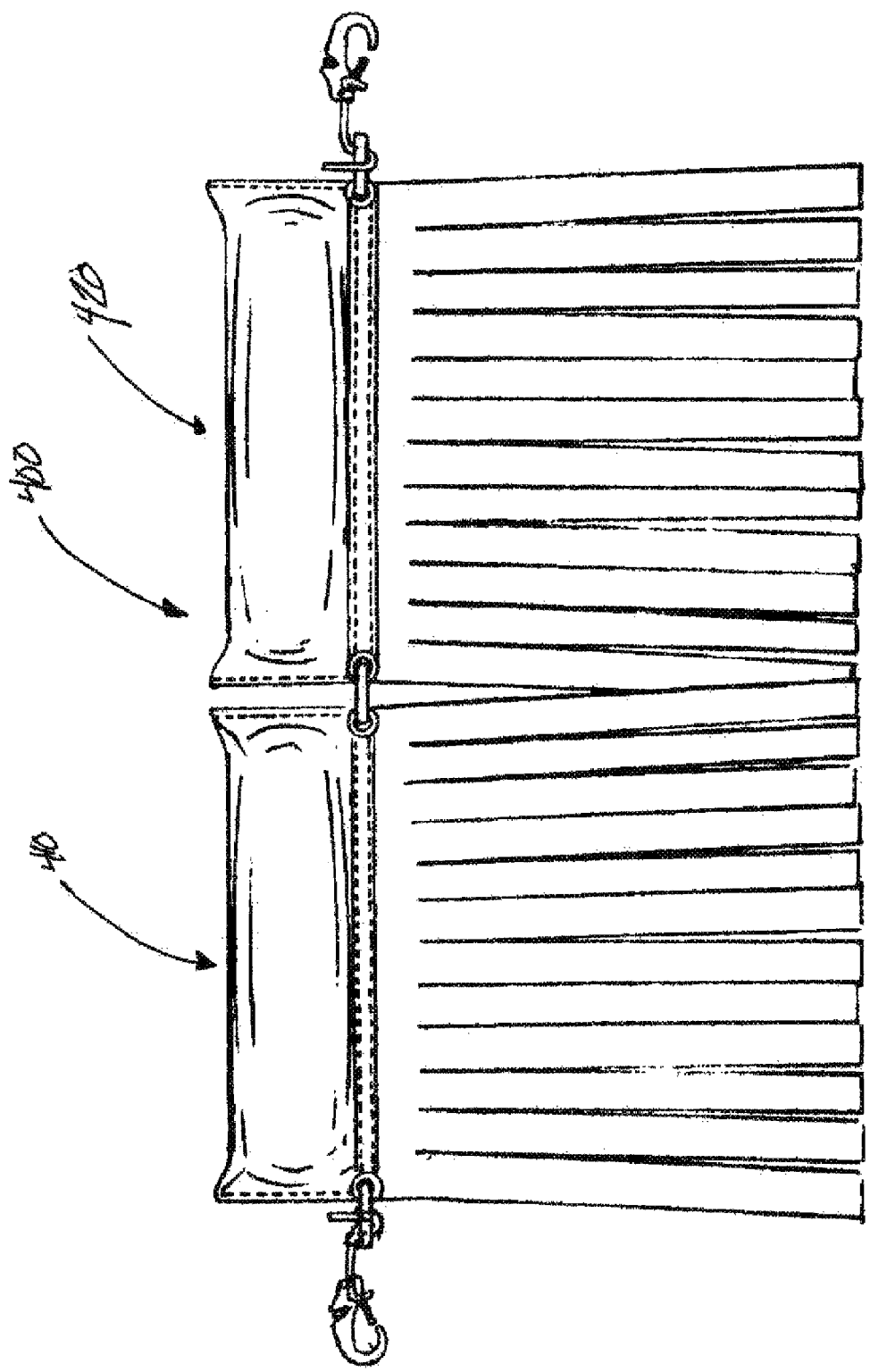
FIG. 9 is a front view of one embodiment of the skirted boom prior to installation on the hood, wherein two skirted booms are coupled together to form a tandem skirted boom.
Figure 10:
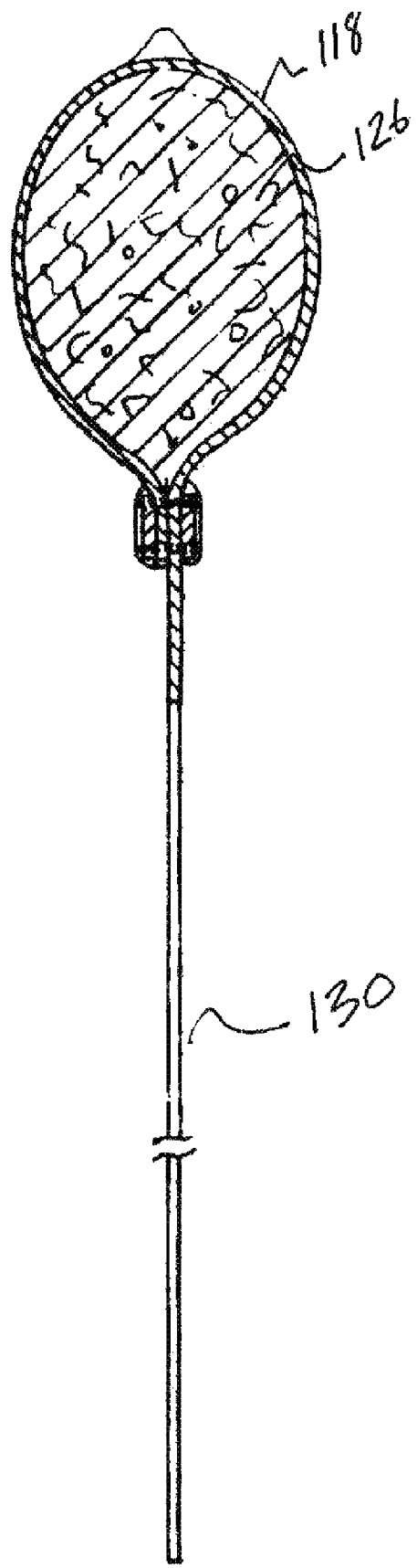
FIG. 10 is cut away view AA, as indicated in FIG. 2 of the skirted boom shown in FIG. 1B, wherein a different configuration of the absorbent material is shown.

FIG. 9 shows one embodiment of the present invention in which a tandem skirted boom 400 is shown. This configuration is preferred for large hoods 200, so that the installed tandem skirted boom 400 surrounds substantially the entire exterior surface of the hood at the static water level line 360 when secured relative thereto. The tandem skirted boom 400 comprises a first skirted boom 410 and a second skirted boom 420. The first 410 and second 420 skirted booms are coupled together via left and right grommet. A tether assembly is connected to left end 430 and right end 440 of the tandem skirted boom 400. The tandem skirted boom 400 is then installed on a hood 100. It should be understood that any number of skirted booms may be connected together to increase the size of the skirted boom for larger hoods.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. An apparatus for reducing pollution in wastewater that collects in a catch basin, said apparatus comprising:

a hood mounted to an interior wall of catch basin over an outlet in said interior wall;

a skirted boom, said skirted boom comprising;
an upper portion;
a skirt extending down from said upper portion;
wherein said skirted boom is fixed relative to said hood such that said upper portion substantially surrounds an outer surface of said hood; and
wherein a bottom of said skirt extends below said hood.

2. The apparatus of claim 1, wherein at least a portion of said upper portion is adjacent to said hood.

3. The apparatus of claim 2, wherein said upper portion is adjacent to an outside surface of said hood at a static water line in said catch basin.

4. The apparatus of claim 2, wherein at least a portion of said skirt comprises a plurality of adjacent vertical strips.

5. The apparatus of claim 4, wherein said adjacent vertical strips extend below said hood.

6. The apparatus of claim 5, wherein said skirted boom is fixed relative to said hood so that a least a portion of said wastewater flowing though said catch basin passes through said adjacent vertical strips.

7. The apparatus of claim 6, wherein one or more of said upper portion and said skirt comprise a pollutant absorbent material.

8. The apparatus of claim 7, wherein said pollutant absorbent material is treated with an antimicrobial agent.

9. The apparatus of claim 5 further comprising one or more attachment elements, said attachment element being adapted to fix said skirted boom relative to said hood.

10. The apparatus of claim 9, wherein said attachment element is further adapted to connect to one or more of said wall of said catch basin and said hood.

11. The apparatus of claim 10, wherein said attachment element comprises:
a length of cord having a proximal end and a distal end;
a first fastener coupled to said proximal end; and
a second fastener coupled to said distal end.

12. The apparatus of claim 1, further comprising a second skirted boom fixed in position relative to said hood inside said catch basin.

13. An apparatus for mounting around an outlet of a catch basin which receives a wastewater mixture with a variety of waste materials such as a first liquid having a first specific gravity that is lower than that of water so as to float on the water and with solids suspended in the wastewater mixture and debris floating on the mixture, comprising:
a hood extending along an axis, and having a wall shaped to partially sealingly fit around the outlet of an interior wall of the catch basin so as to define at least a partially sealable compartment therewith that is open to the outlet and extends below the outlet so that waste materials floating on said water mixture outside of the compartment are prevented from entering said outlet;
a skirted boom comprising:
an upper portion;
a skirt extending down from said upper portion;
wherein at least a portion of said skirt comprises a plurality of vertical strips; and
wherein said skirted boom is fixed relative to said hood such that said upper portion substantially surrounds an outer surface of said hood.

14. The apparatus of claim 13, further comprising one or more attachment elements, said attachment element being adapted to secure said skirted boom relative to said hood inside said catch basin so that a least a portion of said wastewater flowing though said catch basin passes between said vertical strips.

15. The apparatus of claim 14, wherein said attachment element comprises:
a length of cord having a proximal end and a distal end;
a first fastener coupled to said proximal end; and
a second fastener coupled to said distal end.

16. The apparatus of claim 13, comprising a second skirted boom, wherein said first and second skirted booms are coupled together.

17. The apparatus of claim 16, wherein said upper portion of said second skirted boom is adjacent to at least a portion of said outer surface of said hood.

18. A method for fixing a skirted boom relative to a hood mounted to an interior wall of a catch basin, said method comprising the steps of:
providing a skirted boom;
providing a first attachment element;
connecting a proximal end of said first attachment element to said skirted boom;
lowering said skirted boom and said first attachment element into said catch basin; and
connecting a distal end of said first attachment element to one or more of said hood and said interior wall of said catch basin so that said skirted boom is fixed relative to said hood and said upper portion substantially surrounds an outer surface of said hood.

19. The method of claim 18, further comprising the steps of:
providing a second attachment element;
connecting a proximal end of said second attachment element to said skirted boom; and
connecting a distal end of said second attachment element to one or more of said hood and said interior wall of said catch basin.

20. The method of claim 18, wherein the steps of the method are performed by a person standing outside said catch basin.

* * * * *